Aug. 2, 1938.  A. URFER  2,125,409
ENGINE SYNCHRONIZER AND TACHOMETER
Original Filed Jan. 18, 1930  2 Sheets-Sheet 2
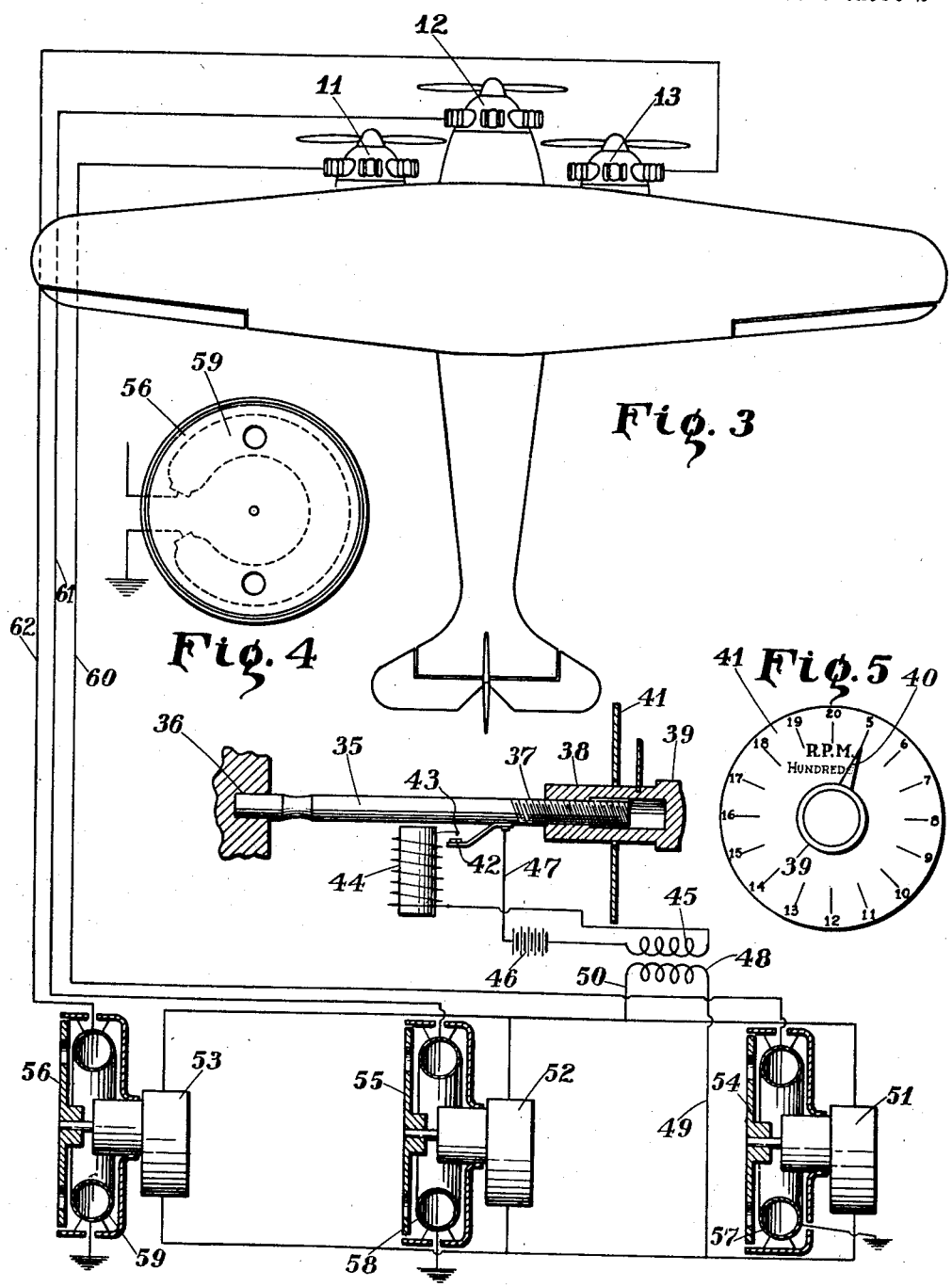
INVENTOR.
Adolf Urfer
BY Stephen Cerstvik
ATTORNEY.

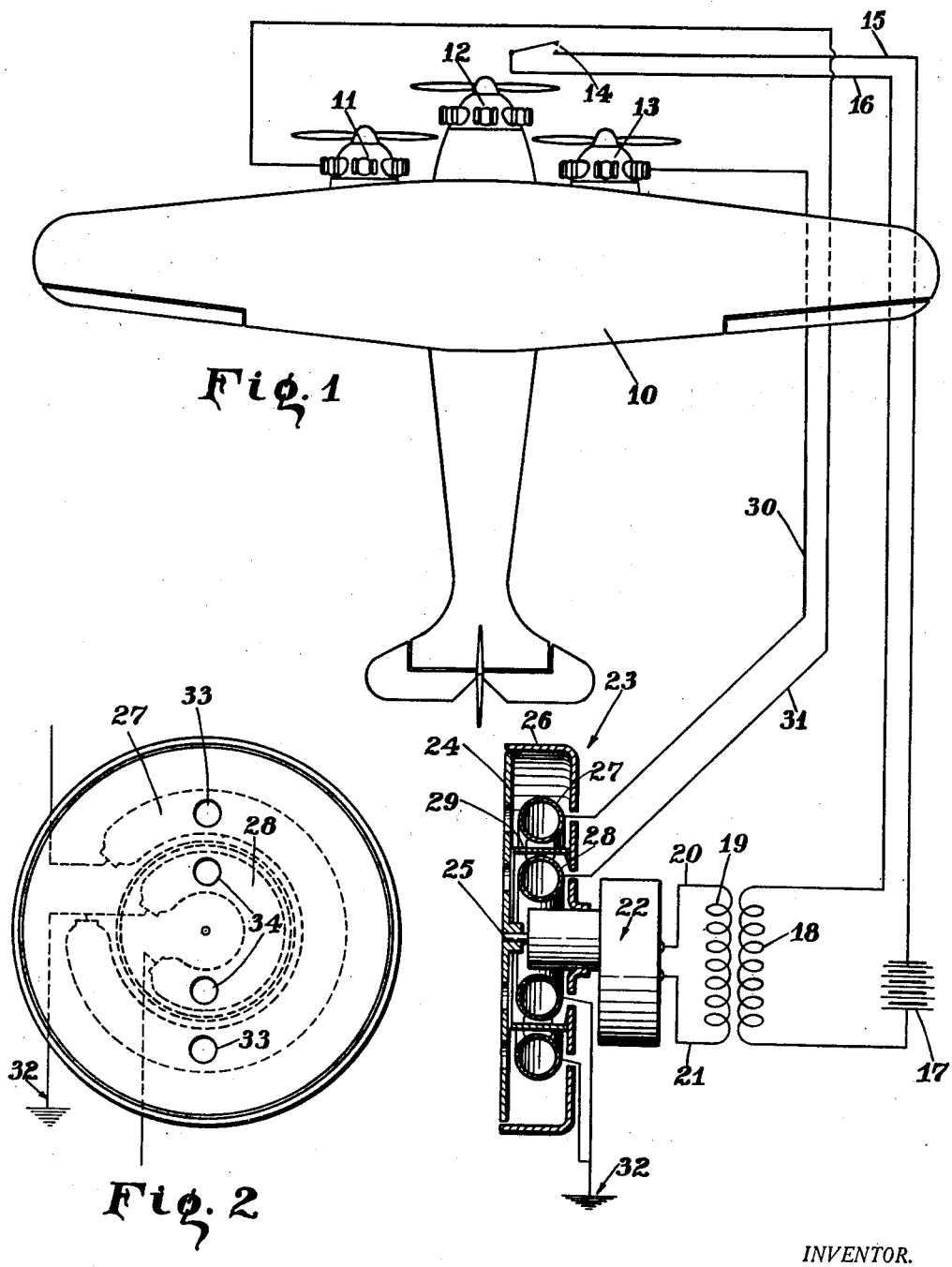

Patented Aug. 2, 1938

2,125,409

UNITED STATES PATENT OFFICE 2,125,409

ENGINE SYNCHRONIZER AND TACHOMETER

Adolf Urfer, Yonkers, N. Y., assignor to Pioneer Instrument Company, Inc., Brooklyn, N. Y., a corporation of New York Original application January 18, 1930, Serial No. 421,855. Divided and this application September 17, 1935, Serial No. 41,002

2 Claims. (Cl. 175—183)

This invention relates to engine synchronizers and tachometers and more particularly to a device for accurately comparing the rotative speeds of two or more elements with each other and/or with a standard, and is a division of copending application Serial No. 421,855, filed January 18, 1930.

It has been found to be very desirable to be able to synchronize all the motors on multimotored aircraft. When the motors are slightly out of synchronism, the vibrations of the motors form beats of a frequency depending upon the difference in frequency of the vibrations of the motors. These secondary vibrations set up in the framework of the aircraft are of much greater amplitudes than the primary vibrations and produce dangerous stresses which may result in failure of vital elements of the framework and controls.

In case of a cabin plane, these secondary vibrations produce a very disagreeable rumbling, causing complaints from passengers and impairing the efficiency of the pilot.

In order to prevent the occurrence of these secondary vibrations it is necessary to synchronize the motors within a few R. P. M. This is practically impossible with the ordinary commercial tachometers since they are not sufficiently accurate. A good commercial tachometer will have an error of plus or minus 15 to 20 R. P. M. at the cruising speed of the aircraft.

Furthermore, commercial tachometers which are mounted on the motors are poorly visible, if at all, from the operator's position, especially in case of fog or frost. On the other hand, when the tachometers are mounted in front of the operator and driven from the motors by means of flexible shafts, the shafts are expensive and subject to comparatively rapid deterioration while the back-lash and whip of the long shafts required cause erratic and unsatisfactory results. Moreover, the coordination of the readings of a plurality of instruments connected to the motors to be synchronized is difficult, especially when the instruments are widely separated.

One object of the present invention is to provide a novel device for indicating accurately the relative speed of two or more rotating elements.

Another object is the provision of such an indicating device which can be mounted in any desired location and at any distance from the rotating element without impairing its efficiency.

A further object of the invention is to provide such an indicating device in which the transmission mechanism is accurate, efficient and free from deterioration during long periods of use.

Another object of the invention is to provide such a device which is adaptable to any number of rotating elements without undue complication or space requirements.

Another object is the provision of such a device which operates on the principle of a stroboscope whereby the operator is required to observe only a single indicating means while effecting the synchronization of the rotory elements.

A still further object of the invention is to provide such an indicating device which includes a calibrated, adjustable standard of speed with which the rotating elements may be synchronized.

Further objects and advantages will be apparent to those skilled in the art from the following description taken in connection with the accompanying drawings in which:

Fig. 1 is a diagrammatic representation of the device as applied to a tri-motored aeroplane, the indicating instrument being shown partly in section on an enlarged scale.

Fig. 2 is a front elevation of the indicating device.

Fig. 3 is a view similar to Fig. 1 of an embodiment of the invention which includes an adjustable standard of speed whereby the device becomes a tachometer as well as a synchronizer.

Fig. 4 is a front view of one of the indicating devices illustrated in Fig. 3; and Fig. 5 is a face view of the dial of the standard frequency device.

In Fig. 1 of the drawings, an aeroplane is conventionally illustrated at 10 having a plurality of motors 11, 12 and 13 which it is desired to maintain in synchronism during flight.

An electrical contact diagrammatically illustrated at 14 is mounted on the engine shaft or cam shaft of the engine 12 so as to be instantaneously closed once during every revolution of the engine shaft or cam shaft respectively. Leads 15 and 16 connect the contact 14 in circuit with a battery 17 and the primary 18 of a transformer which may be mounted at any convenient location in the ship.

The secondary 19 of the transformer is connected by leads 20 and 21 to a single phase, self-starting, synchronous motor 22 which forms part of an indicating device 23 mounted for convenient observation by the operator. Motors of this character are commercially available.

Disc 24 of any suitable light material such as sheet aluminum is rigidly mounted on the end of shaft 25 of motor 22 to rotate therewith. A casing 26 is mounted on the frame of the motor 22 and is adapted to surround disc 24 and form a chamber at the rear thereof. A pair of ring-shaped neon type lamps 27 and 28 are concentrically mounted in the casing 26, separated by an annular partition 29 mounted rigidly on the back of said casing. Lamp 27 is connected by means of a lead 30 to a spark plug of engine 13 while lamp 28 is connected by means of a lead 31 to a spark plug of engine 11, the opposite ends of said lamps being grounded as indicated at 32. It will thus be seen that lamps 27 and 28 will be intermittently lighted in synchronism with the rotation of engines 13 and 11 respectively.

Disc 24 is provided with one or more openings 33 and 34 located directly opposite lamps 27 and 28 respectively so that the lamps may be observed therethrough.

In operation, with the engines running, the disc 24 is rotated by the motor 22 in synchronism with the rotation of the engine 12 while at the same time the lamps 27 and 28 will flash in synchronism with the rotation of engines 13 and 11 respectively. It will be understood that synchronism as here used may mean rotation at any convenient multiple or fraction of engine speed. In the present case since the lamps 27 and 28 are connected to a spark plug on the corresponding engines, the lamps will obviously flash at one half engine speed. The contact 14 may be conveniently driven from the cam shaft of engine 12 and will then cause disc 24 to rotate at one half the speed of said engine.

If now the engines are all rotating in synchronism it will be apparent that the openings 33 and 34 of disc 24 will always be in the same position at the instant the lamps 27 and 28 are illuminated so that to the observer these openings appear as stationary spots of light. If one of the engines 11 or 13 is running slower than the engine 12, however, the spots corresponding thereto will appear to be travelling in the direction of the rotation of disc 24. If it is running faster than the engine 12, the spots corresponding thereto will appear to be travelling in the opposite direction to the rotation of the disc. If the spots appear to travel very slowly, the engines are nearly synchronized, while if the spots appear to rotate rapidly, the speeds of the engines differ by appreciable amounts. It is thus possible for the operator to estimate the difference in speeds between the engines and be guided thereby in adjusting the controls to secure synchronization.

In Figs. 3, 4 and 5 of the drawings, there is illustrated an embodiment of the invention in which a calibrated means for generating electrical impulses of known frequency is substituted for the contact 14 of engine 12. In the form shown, this means comprises a bar 35 preferably formed of material such as "elinvar" which is substantially unaffected by temperature changes, mounted rigidly at one end as at 36 and having its other end free to vibrate. The free end of bar 35 is threaded as at 37 and carries a weight member 38 adjustably threaded thereon. Weight 38 is formed at its outer end with a knob 39 for facility in adjusting the same and a pointer 40 adapted to cooperate with a stationary dial 41, see Fig. 5, to indicate the position of the weight member 38. The dial 41 is calibrated preferably in revolutions per minute as indicated in Fig. 5. It will be understood that the rate of vibration of the bar 35 is preferably in the present instance one half the number of R. P. M. indicated on the dial.

The vibrating bar 35 carries a contact 42 which is adapted to cooperate with a fixed contact 43 during the vibration of said bar. Contact 43 is connected through a magnet 44 and the primary 45 of a suitable transformer to a battery 46 while the movable contact 42 is connected as by means of a lead 47 to the opposite end of battery 46.

The secondary 48 of said transformer is connected by means of leads 49 and 50 to a series of synchronous motors 51, 52 and 53 similar to motor 22 previously described, said motors thus being all connected to rotate in synchronism with the vibration of the bar. Motors 51, 52 and 53 rotate discs 54, 55 and 56 of indicators corresponding to engines 11, 12 and 13 respectively. Lamps 57, 58 and 59 are connected through leads 60 61 and 62 to a spark plug of their corresponding engines, the opposite ends of said lamps being grounded.

In operating this embodiment of the invention, the knob 39 is adjusted to set the pointer 40 at the number of R. P. M. at which it is desired to drive the engines. The operator thereupon adjusts the controls of the engines one at a time until the corresponding indicator shows the engine to be in synchronism with the vibrations of the bar 35 in the manner previously described.

It will thus be seen that the present embodiment of the invention serves not only as a synchronizer whereby the engines of an aircraft may all be accurately synchronized irrespective of the number thereof, but also serves as a tachometer since the operator is enabled to know the exact number of R. P. M. at which the engines are rotating. Although certain of the embodiments of the invention have been shown and described in detail, it will be understood that such embodiments are not exclusive and other embodiments will suggest themselves to those skilled in the art, and certain parts may be altered, or omitted and changes made in the arrangement and mode of operation thereof without departing from the spirit of the invention.

Reference will, therefore, be had to the claims hereto appended for a definition of the scope of the invention.

What is claimed is:

1. Means for determining the speed of rotation of a continuously rotating element, comprising a calibrated element continuously vibrating at a known frequency, means operated by said calibrated vibrating element for producing electrical impulses of the same frequency as that of the vibrating element, means operated by the rotating element for also producing electrical impulses, the latter impulses having a frequency corresponding to the speed of rotation of the rotating element, stroboscopic means operated by the impulses produced by both of said means for furnishing an indication of synchronism between said frequencies and, hence, between said rotating and vibrating element, means for adjusting said vibrating element until its frequency is indicated by said stroboscopic means to be the same as the frequency of the impulses produced by the rotating element, and means for indicating the frequency of said vibrating element in terms of the speed of said rotating element.

2. Means for determining the speed of rotation of a continuously rotating element, comprising a calibrated element continuously vibrating at a predetermined frequency, means operated by said calibrated vibrating element for producing electrical impulses of the same frequency as that of the vibrating element, means operated by the rotating element for also producing electrical impulses, the latter impulses having a frequency corresponding to the speed of rotation of the rotating element, means periodically illuminated by one of the sets of impulses, means for periodically altering the visibility of said illuminating means whereby said illuminating means produce an indication of whether said rotating and vibrating element are in synchronism, means for adjusting the vibrating element so that the frequency of the impulses produced thereby corresponds to the frequency of the impulses produced by the rotating element, and means for indicating the frequency of said vibrating element in terms of speed of said rotating element.

ADOLF URFER.